Jan. 28, 1947.　　　L. E. JOHNSON　　　2,414,879
ELECTRO-INERTIA BRAKE
Filed Feb. 1, 1944　　　2 Sheets-Sheet 1

Louis E. Johnson,
INVENTOR.

BY
*Victor J. Evans & Co.*
ATTORNEYS

Jan. 28, 1947. L. E. JOHNSON 2,414,879
ELECTRO-INERTIA BRAKE
Filed Feb. 1, 1944 2 Sheets-Sheet 2

Louis E. Johnson,
INVENTOR.

BY
Victor J. Evans & Co.
ATTORNEYS

Patented Jan. 28, 1947

2,414,879

UNITED STATES PATENT OFFICE 2,414,879

ELECTROINERTIA BRAKE

Louis E. Johnson, Huntsville, Ala.

Application February 1, 1944, Serial No. 520,654

4 Claims. (Cl. 188—182)

1

The invention relates to vehicle brakes, and more especially to electro-inertia brakes for motor vehicles.

The primary object of the invention is the provision of a brake of this character, wherein the wheel of a vehicle will be caused to slow down to its threshold of skidding, but not to effect skidding, and in this manner maximum braking power is arrived at, and thus stop the vehicle in motion.

Another object of the invention is the provision of a brake of this character, wherein the mechanism is an adjunct of each wheel of the vehicle, and the braking power of each is proportionately to braking effect without causing skidding, and making it impossible for the vehicle to turn when the brakes are applied to the respective wheels at high speed.

A further object of the invention is the provision of a brake of this character, wherein the construction and arrangement thereof are novel and unique, it being effective for increased braking power, and is easy in operation.

A still further object of the invention is the provision of a brake of this character, wherein the same is a part of the hydraulic braking set-up in a motor vehicle, and assures quick braking action, without liability of skidding or the locking of the brakes, in the use thereof.

A still further object of the invention is the provision of a brake of this character, which is simple in construction, thoroughly reliable and efficient in operation, strong, durable, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings.

Similar reference characters indicate corresponding parts throughout the several views in the drawings.

2

Figure 1:
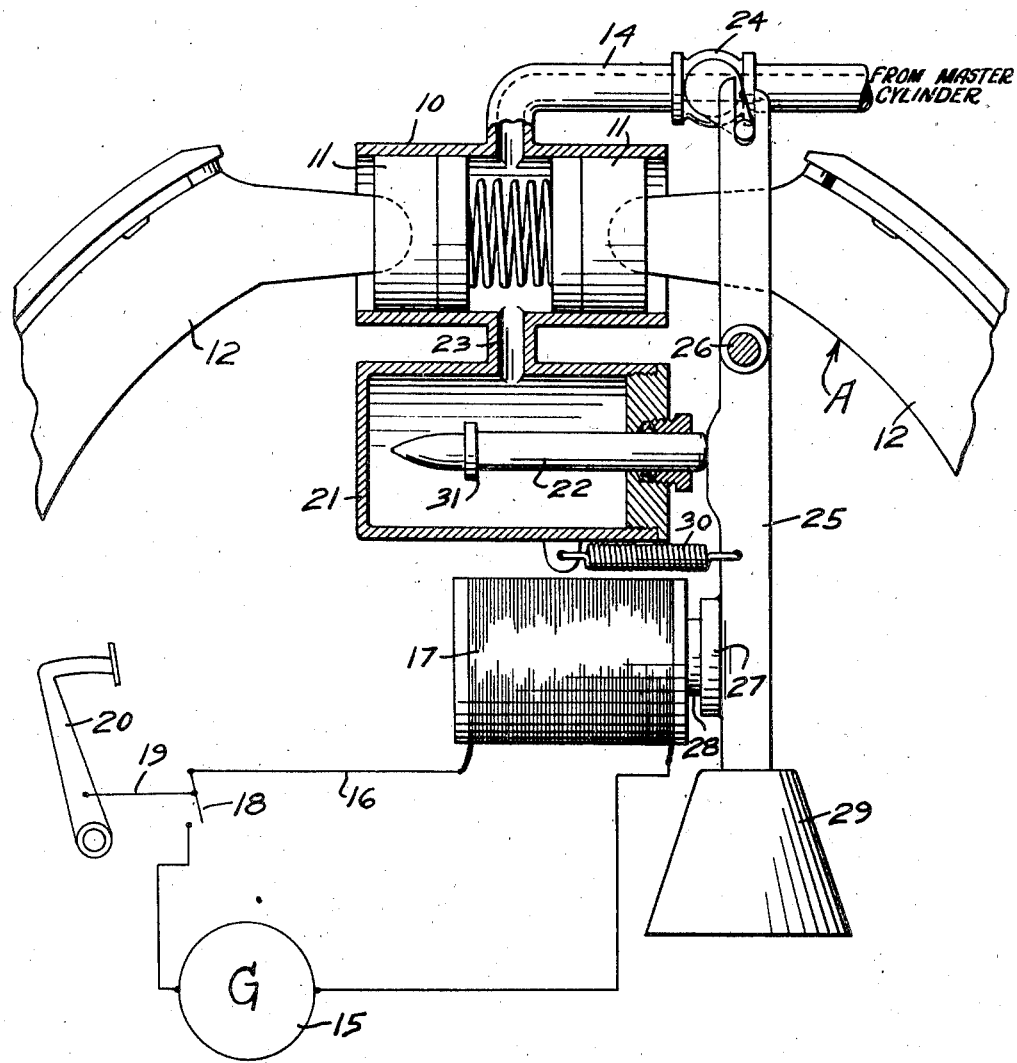
Figure 1 is a fragmentary sectional and diagrammatic view of the brake constructed in accordance with the invention.
Figure 2:
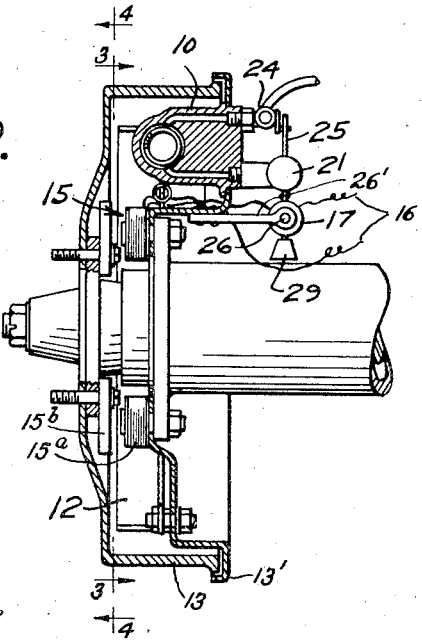
Figure 2 is a vertical cross sectional view through the brake drum, with the invention applied.
Figure 3:
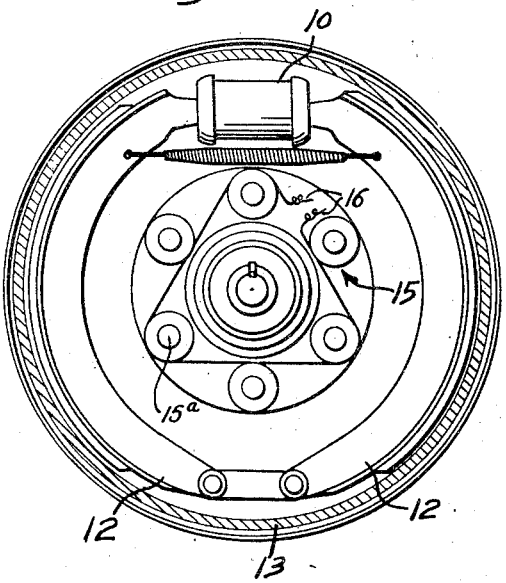
Figure 3 is a sectional view on the line 3—3 of Figure 2 looking in the direction of the arrows.
Figure 4:
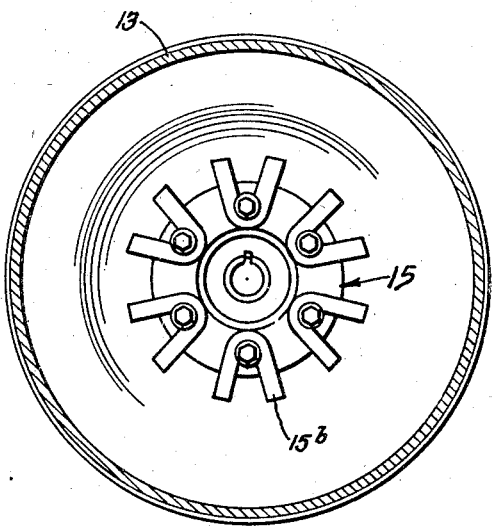
Figure 4 is a sectional view on the line 4—4 of Figure 2 looking in the direction of the arrows.

Referring to the drawings in detail A designates generally the electro-inertia brake construction in accordance with the invention and hereinafter set forth.

The brake A comprises a hydraulic cylinder 10, having as usual interiorly thereof the fluid actuated means 11 for the operation of the brake band, only the ends 12 thereof being shown in Figure 1 of the drawings, for coaction with the brake drum 13 which is as is common a part of a vehicle wheel not shown. The cylinder 10 receives its fluid supply from a feed conduit, a portion thereof being indicated at 14, which is a part of a hydraulic braking system, the standard equipment in modern day motor vehicle. Arranged within the brake drum 13 is a small electric generator 15 comprising field coils 15a and poles 15b, which is operated by the vehicle wheel, and having in its current circuit 16 an electromagnet 17, and a manually operated switch 18, respectively. The switch 18 through connections 19 is controlled by a foot or hand brake pedal 20 which is properly located within the vehicle for manual operation in the actuation of the hydraulic braking system installation therefor.

Immediately below the cylinder 10 is an activating cylinder 21 having a volume displacing plunger 22 therein, and these cylinders have communication with each other through a pipe coupling 23 for the exchange of fluid therebetween. The conduit 14 close to the cylinder 10 is fitted with a turn plug valve 24 which is controlled by an activating lever 25, pivotally supported at 26 on the bracket 26', and this lever carries a soft iron attraction plate 27 adjacent to the armature 28 of the magnet 17, and also mounted at the lower free end of the said lever is an inertia weight 29. The cylinder 21 has attached thereto a spring 30 which is also attached to the lever 25, the spring 30 being for the purpose of maintaining placement of the said lever with relation to the plunger 22, and the disposition of such spring with respect to the weight 29 assures more leverage.

The cylinders 10 and 21, as well as the magnet 17 are suitably fixed to the stationary part of the brake 13', while the movable part of the latter is in association with the wheel of the vehicle as usual.

The plunger 22 is provided with a shoulder 31 which prevents the said plunger from being forced out of the cylinder 21 should the said plunger escape the lever 25 due to faulty operation of the mechanism.

The parts of the mechanism are in a compact arrangement with respect to the brake band 12 and the drum 13 for each wheel of the vehicle.

The electro-inertia brake is especially designed for use in connection with hydraulic braking systems and as before set forth comprises a small generator 15 mounted in and operated by the wheel of a vehicle to furnish current for energizing an electro-magnet 17. The armature 28 of the magnet 17 is mounted to operate a lever 25 pivoted adjacent to its upper end and carrying a weight 29 at its free lower end. Mounted immediately below and communicating with the brake operating cylinder 10 of the wheel is an auxiliary cylinder 21 having a piston or plunger 22 therein engaging an abutment formed on the weighted lever 25. A switch 18 operated by the vehicle brake pedal 20 connects the output of the generator 15 with the magnet 17 as the pedal 20 is depressed to apply the brakes, thereby energizing the magnet 17 and causing the weighted lever 25 to be held against movement. The upper end of the weighted lever 25, above the pivotal point 26, is operatively connected with the valve 24 which is interposed in the conduit 14 leading from the master brake cylinder to the brake operating cylinder 10 in the wheel drum 13. When the magnet 17 is energized this valve 24 is in its fully open position. As the wheel comes to a stop, due to operation of the brake pedal 20 by a driver of the vehicle, the generator 15 is slowed to a point where the magnet 17 is no longer energized to hold the weighted lever 25 and due to inertia the lever 25 swings away from the magnet 17, releasing the plunger 22 in the auxiliary cylinder 21 which moves outwardly under the pressure of fluid and is displaced by the fluid from the brake operating fluid thereby reducing the brake pressure to sufficient extent as to prevent locking of the wheel. At the same time the upper end of the weighted lever 25 closes the valve 24 in the conduit 14 leading from the master cylinder. Full braking power is thus permitted up to the point of locking the wheel but without reaching such locking point and skidding is thus prevented. The foregoing arrangement applies to each wheel of the vehicle.

What is claimed is:

1. An electro-inertia brake system, comprising a hydraulic brake, a brake pedal controlling said brake, a vehicle wheel actuated electric generator, a hydraulic cylinder operating said brake, an activating cylinder in communication with said hydraulic cylinder and having a volume displacing plunger within the same, a switch controlled by said brake pedal for controlling the circuit of said generator, an inertia operated pivoted weighted lever adapted for contact with said plunger for controlling the action of said brake, and an electro-magnet controlled by said generator and regulating the activity of said inertia operated lever.

2. An electro-inertia brake system, comprising a hydraulic brake, a brake pedal controlling said brake, a vehicle wheel actuated electric generator, a hydraulic cylinder operating said brake, an activating cylinder in communication with said hydraulic cylinder and having a volume displacing plunger within the same, a switch controlled by said brake pedal for controlling the circuit of said generator, an inertia operated pivoted weighted lever adapted for contact with said plunger for controlling the fluid in the brake system when said brake pedal is actuated, a valve in the brake system and operatively connected with said lever, and an electro-magnet controlled by said generator and regulating the activity of said lever.

3. An electro-inertia brake system, comprising a hydraulic brake, a brake pedal controlling said brake, a vehicle wheel actuated electric generator, a hydraulic cylinder operating said brake, an activating cylinder in communication with said hydraulic cylinder and having a volume displacing plunger within the same, a switch controlled by said brake pedal for controlling the circuit of said generator, an inertia operated pivoted weighted lever adapted for contact with said plunger for controlling the fluid in the brake system when said brake pedal is actuated, a valve in the brake system and operatively connected with said lever, an electro-magnet controlled by said generator and regulating the activity of said lever, and spring means associated with said lever to maintain it in contact with said plunger.

4. An electro-inertia brake system, comprising a hydraulic brake, a brake pedal controlling said brake, a vehicle wheel actuated electric generator, a hydraulic cylinder operating said brake, an activating cylinder in communication with said hydraulic cylinder and having a volume displacing plunger within the same, a switch controlled by said brake pedal for controlling the circuit of said generator, an inertia operated pivoted weighted lever adapted for contact with said plunger for controlling the fluid in the brake system when said brake pedal is actuated, a valve in the brake system adapted to be actuated by said lever, an electro-magnet controlled by said generator and regulating the activity of said lever, and means associated with said lever to maintain it in contact with said plunger, said activating cylinder acting to maintain the brake system, plunger and lever in co-operative working relation with each other.

LOUIS E. JOHNSON.